United States Patent

[11] 3,573,829

| [72] | Inventors | Frank H. Johnson<br>Ridgewood;<br>Murray Hoffman, Livingston, N.J. |
|---|---|---|
| [21] | Appl. No. | 794,978 |
| [22] | Filed | Jan. 29, 1969 |
| [45] | Patented | Apr. 6, 1971 |
| [73] | Assignee | International Telephone and Telegraph Corporation<br>Nutley, N.J. |

[54] POSITION DETERMINING MOVING HYPERBOLIC SYSTEM
10 Claims, 6 Drawing Figs.

[52] U.S. Cl. ............................................. 343/105, 343/102, 343/112
[51] Int. Cl. ............................................. G01s 1/04, G01s 1/30
[50] Field of Search ............................................. 343/105, 102

[56] References Cited
UNITED STATES PATENTS
2,727,231  12/1955  Gaudillere ................... 343/105
3,111,670  11/1963  Gaudillere ................... 343/105X Primary Examiner—Rodney D. Bennett, Jr.
Assistant Examiner—Richard E. Berger
Attorneys—C. Cornell Remsen, Jr., Walter J. Baum, Percy P. Lantzy, Philip M. Bolton, Isidore Togut and Charles L. Johnson, Jr.

ABSTRACT: In order to determine relative position, three spaced antennas $A_{T1}$, $T_{T2}$, $A_{T3}$, are coupled to a transmitter and respectively radiate $f_1$, $f_2$, and $f_3$ to provide two sets of moving hyperbolic isophases in space. A receiver at a distance, having three spaced antennas, measures the velocity of each set of isophases as they sweep past said antennas by a phase comparison of the beat frequencies $f_1-f_2$ and $f_2-f_3$ present at each receiving antenna. Said velocity information is subsequently coupled to a computer which determines therefrom the polar coordinates of said receiver with respect to said transmitter and their rate of change.

Patented April 6, 1971

DIRECTION OF MOTION

DIRECTION OF MOTION

W=CONSTANT

P
W
O (OBSERVER)
Sr
θ
SOURCE
W

S1
W12
S2
W23
S3
W

INVENTORS
FRANK H. JOHNSON
MURRAY HOFFMAN
BY
ATTORNEY 3,573,829

POSITION DETERMINING MOVING HYPERBOLIC SYSTEM

BACKGROUND OF THE INVENTION

1. Field of the Invention

The present invention relates generally to hyperbolic navigation systems and more particularly to one wherein multifrequency signals are transmitted, which establish, inter alia, moving isophase lines in space and a receiver measures the phase velocity of said isophase lines as they sweep past to determine therefrom navigation parameters.

2. Description of Prior Art

Current proposed collision avoidance navigation systems require the accurate acquisition of a universal time base. This time base, for example, is established by a primary ground station which transmits the time base to other secondary stations so that the information will be available to all interrogating aircrafts. However, since the primary time base is transmitted to an interrogating aircraft via a plurality of transmission links, there exists a cumulative error in the signal received by said aircrafts which is due to the errors inherent in said separate transmission links. One such error is that due to the necessity for measuring propagation time from a ground station to an aircraft whose distance from the station is a variable.

The accuracy of said systems utilizing a universal time base depends, inter alia, upon the accuracy with which the time base can be acquired by an interrogating aircraft. Therefore, this approach, because of the additive errors, suffers an inherent unresolved threat of collision to exist.

The above-mentioned systems require, as implementing equipment, that a receiver and a transmitter be installed in each and every aircraft if collisions are to be avoided or alternatively, if maximum safety is to be realized. This requirement imposes a severe financial burden on the owners of small and inexpensive aircrafts because the cost of a receiver which accurately utilizes the received time base information is relatively high.

SUMMARY OF THE INVENTION

It is an object of the present invention to provide an improved hyperbolic navigation system, and particularly to provide an improved receiver therefor.

It is another object of the invention to provide a collision avoidance navigation system wherein an extremely accurate time base is not required.

It a further object of the invention to provide a system wherein all crafts which are supplied with receivers will be protected even if all other aircrafts are equipped with transmitters only.

According to the invention, there is provided, a receiver for a navigation system in which moving isophase lines are emitted by transmitters, which comprises, means for detecting said isophase lines, means for measuring the velocity at which said isophase lines pass said detecting means, and means for deriving navigation information from said measurement.

BRIEF DESCRIPTION OF THE DRAWINGS

The above-mentioned and other objects of this invention will become apparent by reference to the following description in conjunction with the accompanying drawings, in which.

DESCRIPTION OF THE PREFERRED EMBODIMENT

In order to facilitate the comprehension of the theory of the subject invention, the following description is restricted to those events which occur in a plane. The three dimensional case will be obvious to those skilled in the art.

Figure 1:
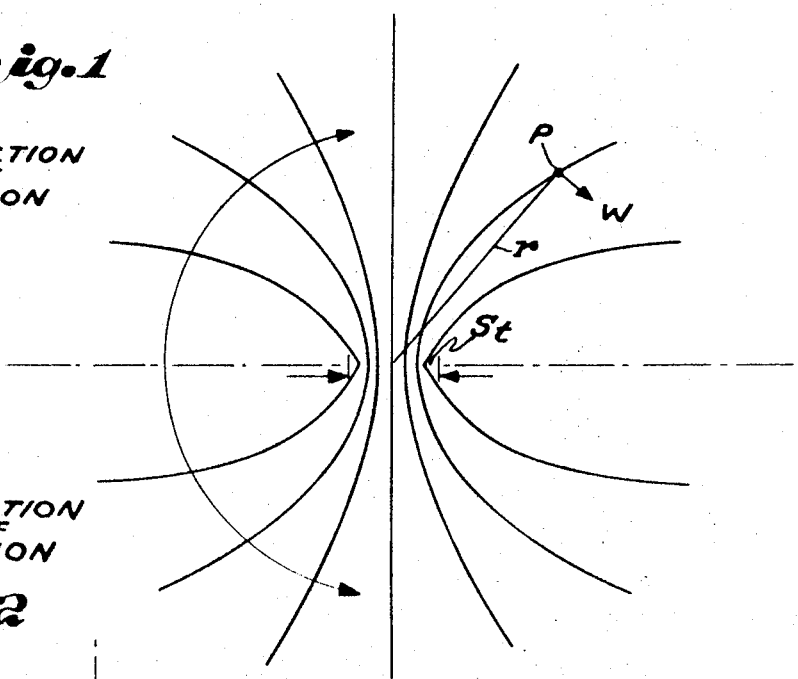
FIG. 1 illustrates a rotating isophase pattern in a plane, useful in explaining the underlying theory of the invention.

The basic concept of the invention involves the transmission of two CW signals which are separated by a fixed frequency $\Delta f$ and transmitted one from each of two antennas which are separated by a distance $S_t$. As illustrated in FIG. 1, it can be shown that in the far field of the radiating antenna pair, that a spacial pattern of rotating isophase contours is provided. The velocity of said isophases as they move past any point in space, measured in a direction perpendicular to a radius vector drawn to said point, is defined as the wash rate and will hereinafter be designated $W$.

Figure 2:
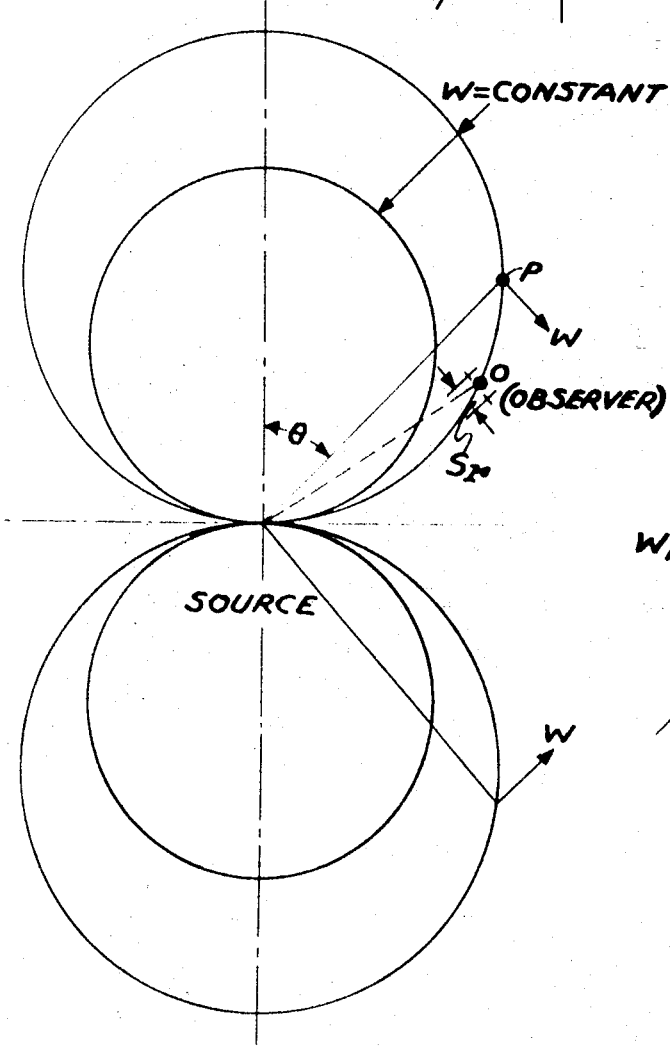
FIG. 2 illustrates constant wash rate contours useful for determining position.

As illustrated in FIG. 2, it can be shown that the locus of points for given wash rate magnitudes are circles defined by:

$$W = \frac{Mr}{\cos \theta} \text{ where}$$

$r =$ range $$M = \frac{C\Delta f}{\sigma S_t}$$

Figure 3:
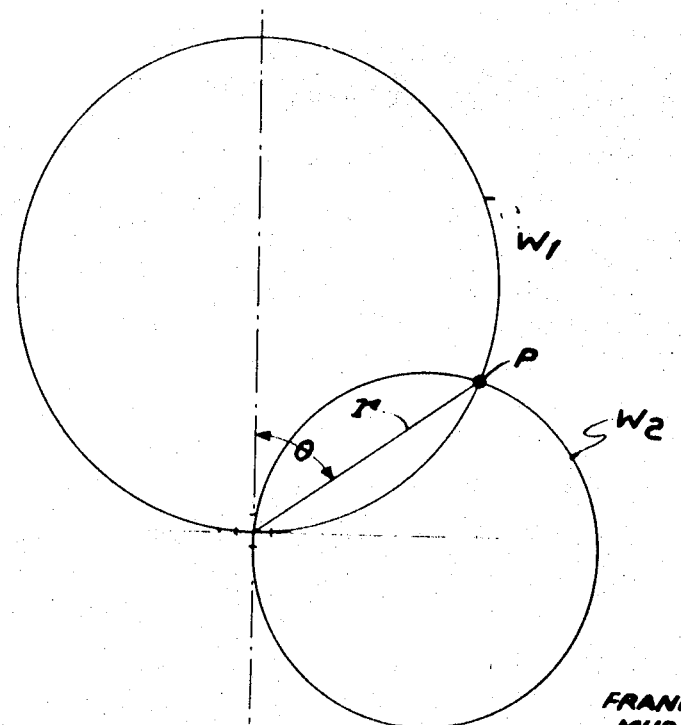
FIG. 3 illustrates a determination of position utilizing constant wash rate contours.

$C =$ Velocity of light $\Delta f =$ Frequency Difference $\sigma =$ Frequency Sum Therefore, a measure of $W$ defines a relationship between $r$ and $\theta$ for point $P$. A second similar pair of antennas, for example, transmitting $f_2$ and $f_3$ and located perpendicular to the first, can be used to provide a second independent relationship between $r$ and $\theta$ which in conjunction with the first measurement may be used to solve for $r$ and $\theta$ explicitly. FIG. 3 graphically illustrates such a solution.

Figure 4:
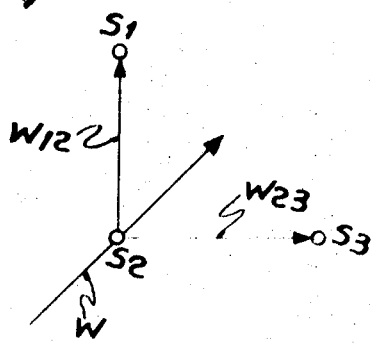
FIG. 4 illustrates the resolution of the wash rate vector $W$.

Wash rate is measured as shown in FIG. 4, for example, by measuring the component vectors of wash rate $W_12$ and $W_23$ in the direction of spaced pairs of antennas $S_1$, $S_2$ and $S_2$, $S_3$ and computing the resultant. Since the antenna separation is fixed, the component vectors are measured by comparing the phases of signals received at the separate antennas.

Therefore, phase measurements at point $P$ are submitted to a computer which through trigonometric operations provides the range $r$ and angle $\theta$.

Figure 5:
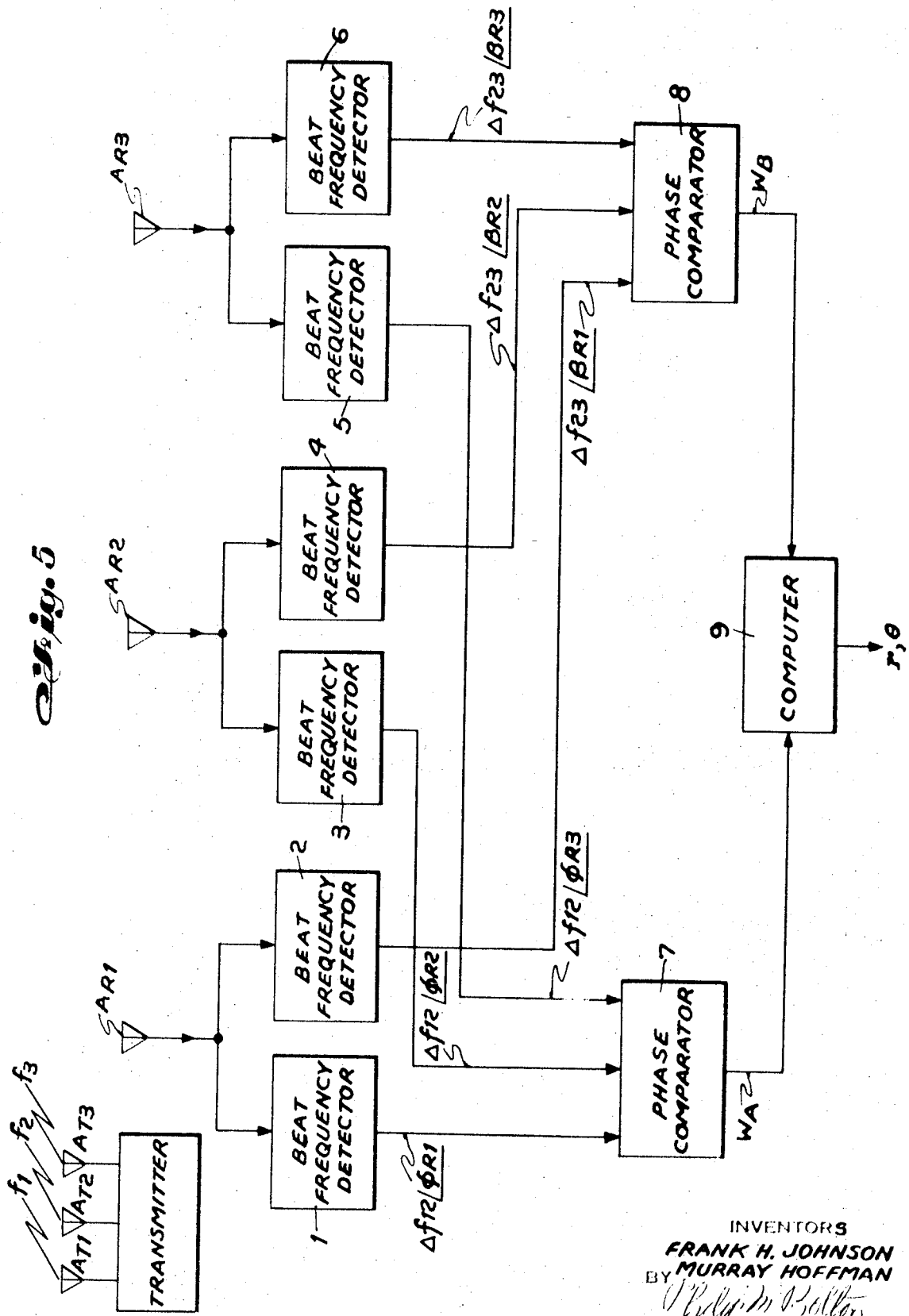
FIG. 5 is a system block diagram of a position determining system according to the invention.

In a first embodiment, as shown in FIG. 5, two sets of isophase lines are provided by transmitting antennas $A_{T1}$, $A_{T2}$ and $A_{T3}$ radiating frequencies $f_1$, $f_2$ and $f_3$ respectively. The frequency difference between $f_1$ and $f_2$ and between $f_2$ and $f_3$ are $\Delta f_{12}$ and $\Delta f_{23}$ respectively.

In a receiver 10, antenna $A_{R1}$ is coupled to beat frequency detectors 1 and 2, antenna $A_{R2}$ is coupled to beat frequency detectors 3 and 4 and antenna $A_{R3}$ is coupled to beat frequency detectors 5 and 6. The outputs of the respective beat frequency detectors 1, 3, 5 and 2, 4, 6 are $\Delta f_{12} \lfloor \phi_{R1}$, $\Delta f_{12} \lfloor \phi_{R2}, \Delta f_{12} \lfloor \phi_{R3}, \Delta f_{23} \lfloor B_{R1}, \Delta f_{23} \lfloor B_{R2}$ and $\Delta f_{23} \lfloor B_{R3}$ respectively. The outputs of beat frequency detectors 1, 3, 5 and 2, 4, 6 are coupled to phase comparators 7 and 8 respectively. Phase comparators 7 and 8 provide the value of the wash rate vectors $W_A$ and $W_B$ corresponding to isophases generated by $f_1$ and $f_2$, and $f_2$ and $f_3$ respectively. The The wash rate signals $W_A$ and $W_B$ are coupled to computer 9 which yields position information, for example, $r$, $\theta$, and their rate of change.

Figure 6:
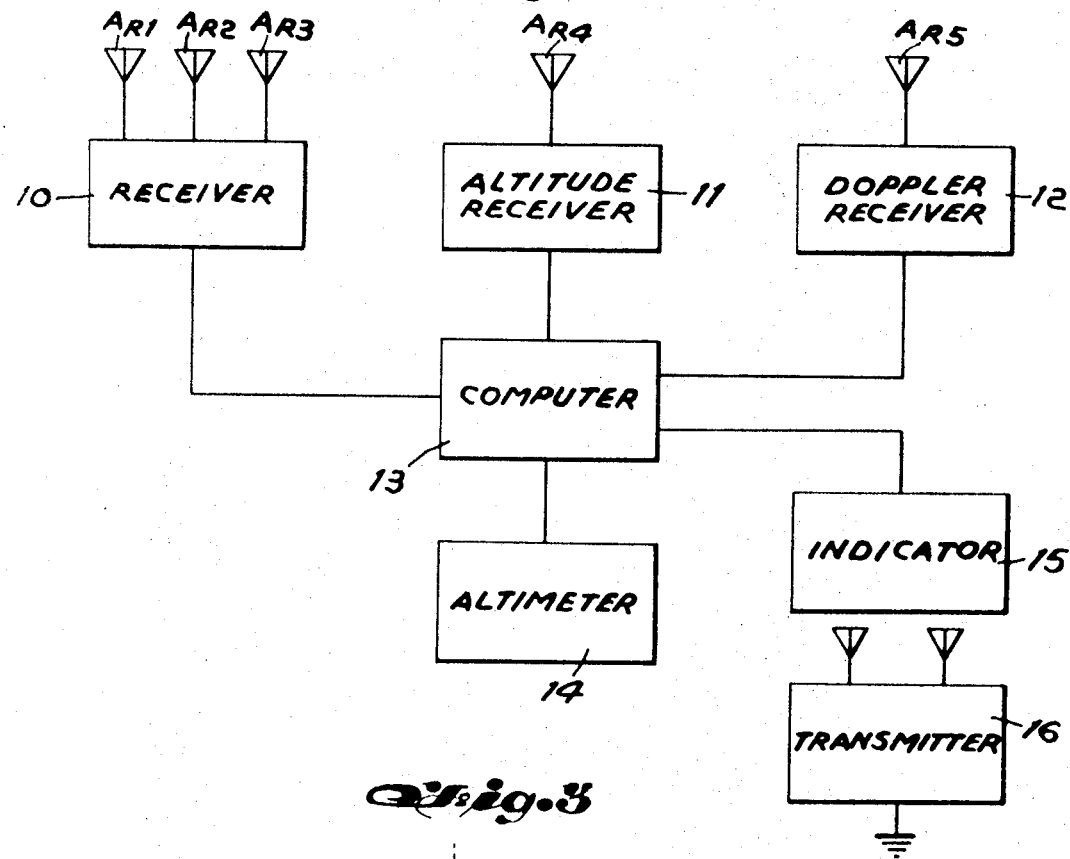
FIG. 6 is a system block diagram of a collision avoidance system according to the invention.

Since the receivers establish $r$ and $\theta$ with respect to a transmitter, it is obvious that the above-described embodiment may be further implemented to provide a collision avoidance system. Accordingly, in a second embodiment, as shown in FIG. 6, a transmitter 16 provides a multifrequency signal which provides isophases in space as well as an amplitude modulated signal bearing transmitter altitude information and a frequency $f_d$ which provides additional range rate information. Receiver 10 which is connected to computer 13, responds to the isophases to establish $r$ and $\theta$, altitude receiver 11 processes the transmitted signal to establish the transmitter 16 altitude information and Doppler receiver 12 extracts a Doppler signal which provides range rate information. The outputs of receivers 10, 11 and 12 are coupled to computer 13 which also receivers own altitude information from an altimeter. With a knowledge of the range, bearing, respective altitudes of the transmitter and receiver and their closing range rate, computer 13 provides an alarm signal which activates alarm indicator 15.

In the above system, it is not necessary that the transmitter transmit continuously. In fact, in order to conserve bandwidth when more than one transmitter is under surveillance, transmission and reception may be frequency and time multiplexed.

We claim:

1. A receiver for a navigation system in which moving isophase lines are emitted by a transmitter, comprising:
   means for detecting said isophase lines;
   means for measuring the velocity at which said isophase lines pass said detecting means; and
   means for deriving navigation information from said measurement.

2. A receiver for a navigation system, according to claim 1, wherein said means for detecting said isophase lines comprises two or more antennas.

3. A receiver for a navigation system, according to claim 2, wherein said means for measuring the velocity at which said isophase lines pass said detecting means comprises beat frequency detecting means coupled to said antennas and means for determining the phase differences between said beat frequencies.

4. A receiver for a navigation system, according to claim 3, wherein said means for deriving navigation information includes a computer.

5. A navigation system comprising:
   a transmitter having means for transmitting moving isophase lines;
   a receiver for measuring the velocity at which said isophase lines pass said receiver; and
   means for deriving navigation information from said measurement.

6. A navigation system, according to claim 5, wherein said transmitter further includes means for transmitting altitude information and means for transmitting transmitter velocity information.

7. A navigation system, according to claim 6, wherein said transmitter transmits periodically.

8. A navigation system, according to claim 6, wherein said receiver further includes means for detecting said altitude information coupled to said deriving means, means for detecting said transmitter velocity information coupled to said deriving means and means for detecting the altitude of said receiver coupled to said deriving means.

9. A navigation system, according to claim 8, wherein said means for deriving navigation information includes computer means for determining the possibility of collision between said transmitter and said receiver.

10. A navigation system, according to claim 9, further including indicator means coupled to said computer means for indicating possibilities of collision.